United States Patent [19]
Jones et al.

[11] Patent Number: 5,738,609
[45] Date of Patent: Apr. 14, 1998

[54] CLUTCH CONTROL SYSTEM

[75] Inventors: Charles John Jones, Coventry; Mark Stanley Willows, Kenilworth; Katharine Dianna Bowker, Leamington Spa, all of United Kingdom

[73] Assignee: Automotive Products, PLC, Warwickshire, United Kingdom

[21] Appl. No.: 682,692

[22] PCT Filed: Oct. 20, 1995

[86] PCT No.: PCT/GB95/02480

§ 371 Date: Jun. 17, 1996

§ 102(e) Date: Jun. 17, 1996

[87] PCT Pub. No.: WO96/12626

PCT Pub. Date: May 2, 1996

[30] Foreign Application Priority Data

Oct. 22, 1994 [GB] United Kingdom ............... 94 21324.6

[51] Int. Cl.$^6$ .................................................. B60K 41/02
[52] U.S. Cl. .............................. 477/175; 477/83; 477/181
[58] Field of Search .............................. 477/83, 84, 174, 477/175, 181, 176, 180, 111, 114; 123/339.19, 339.21, 339.23

[56] References Cited

U.S. PATENT DOCUMENTS

| | | | |
|---|---|---|---|
| 4,598,806 | 7/1986 | Sakakiyama | 477/174 |
| 4,616,614 | 10/1986 | Abe | 123/339.21 |
| 4,662,494 | 5/1987 | Wakiya et al. | 477/83 |
| 4,723,644 | 2/1988 | Sakakiyama | 477/175 |
| 5,024,305 | 6/1991 | Kurihara et al. | 477/175 |
| 5,067,599 | 11/1991 | Roder et al. | 477/176 |
| 5,072,815 | 12/1991 | Jarvis | 477/83 X |
| 5,081,975 | 1/1992 | Maebashi | 123/339.19 X |
| 5,121,820 | 6/1992 | Brown et al. | 477/180 X |
| 5,314,050 | 5/1994 | Slicker et al. | 477/175 X |
| 5,413,542 | 5/1995 | Jarvis | 477/84 |
| 5,427,215 | 6/1995 | Jarvis | 477/84 X |
| 5,586,534 | 12/1996 | Fujimoto | 123/339.23 X |

FOREIGN PATENT DOCUMENTS

| | | |
|---|---|---|
| 0038113A2 | 10/1981 | European Pat. Off. . |
| 2649366 | 1/1991 | France . |

*Primary Examiner*—Khoi Q. Ta
*Assistant Examiner*—Peter T. Kwon
*Attorney, Agent, or Firm*—Paul E. Milliken; Lee A. Germain

[57] ABSTRACT

A clutch control system for the automatic control of a motor vehicle clutch (14) which connects an engine (10) with a gearbox (12) under the control of a driver-operated gear ratio selector member (24). The control system includes an electric control unit (36) which controls the level of clutch engagement in response to an engine speed error signal (E) derived from a comparison of current engine speed (Ve) and a reference speed signal (Vr) generated by the control unit. A sensing means (19a) is provided to detect a "foot-off" condition of an engine controlling accelerator pedal (19) and to provide and indication of the full range of movement of the accelerator pedal from the "foot-off" condition to the fully depressed position. The electronic control unit (36) responds to an accelerator pedal "foot-off" signal to ensure that the reference speed signal is above the engine idle signal by a predetermined amount to prevent creeping of the associated vehicle due to partial clutch engagement at engine idle. In the "foot-on" condition of the accelerator pedal, the reference speed signal is switched to a level determined by accelerator pedal position which is close to engine idle speed at low levels of accelerator pedal depression so that the clutch will engage to a torque transmitting level thus allowing the vehicle to be maneuvered at low engine speeds.

13 Claims, 4 Drawing Sheets

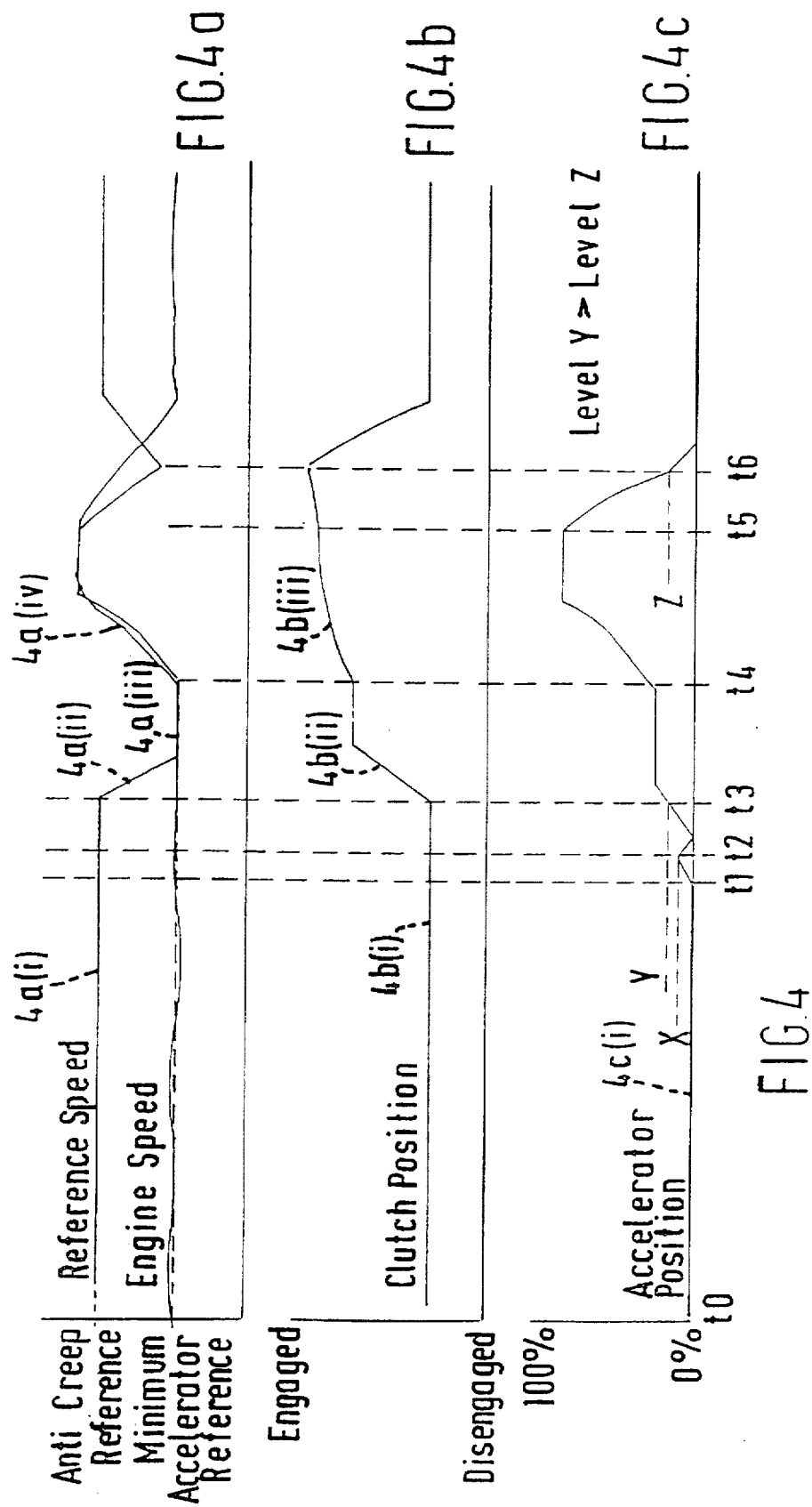

CLUTCH CONTROL SYSTEM

FIELD OF INVENTION

This invention relates to a clutch control system for the automatic control of a motor vehicle clutch which connects an engine with a gearbox under the control of a driver-operated gear ratio selector member, the control system including an electronic control unit which controls initial clutch take-up on starting of the vehicle, clutch re-engagement following each ratio change, clutch disengagement on movement of the gear selector member to change the operative ratio of the gearbox, and clutch disengagement on the coming to rest of the vehicle, the level of clutch engagement being controlled in response to an engine speed error signal derived from a comparison of current engine speed and a reference speed signal generated by the control unit. Such a clutch control system is herein after referred to as a clutch control system of the kind specified.

BACKGROUND OF THE INVENTION

Examples of such systems are described in the applicants earlier European patents Nos. 0038113, 0043660, 0059035 and 0101220 and European Application No. 0566595.

Problems can arise with such systems when low speed manoeuvring is required, e.g. when parking or coupling up a trailer.

In particular, in such systems low speed manoeuvring necessitates the use of excessive engine speed since the clutch dues not normally begin to engage until the engine speed has been raised significantly above engine idle speed.

It is an object of the present invention to mitigate the above low speed manoeuvring problem.

SUMMARY OF THE INVENTION

Thus according to the present invention there is provided a clutch control system of the kind specified provided with sensing means to detect a "foot-off" condition of an engine controlling accelerator pedal and to provide an indication of the full range of movement of the accelerator pedal from the "foot-off" condition to the fully depressed position, the electronic control unit responding to an accelerator pedal "foot-off" signal to ensure that the reference speed signal is above the engine idle signal by a predetermined amount to prevent creeping of the associated vehicle due to partial clutch engagement at engine idle and being arranged on detection of a "foot-on" condition of the accelerator pedal to switch the reference speed signal to a level determined by accelerator pedal position, the reference speed signal being arranged to be close to engine idle speed at low levels of accelerator pedal depression so that the clutch will engage to a torque transmitting level thus allowing the vehicle to be manoeuvred at low engine speeds.

By switching the reference speed signal to a level close to idle speed at low levels of accelerator pedal depression, sufficient level of clutch engagement can be achieved at low engine speeds to enable the associated vehicle to be manoeuvred safely and without the need to raise the engine speed significantly above idle speed.

In practice the "foot-on" condition is set at a very small first predetermined level of depression of the accelerator pedal from the fully released position of the pedal.

The detection of the "foot-on" condition of the accelerator pedal may be accomplished by a sensor (e.g. a rotary potentiometer) which also provided the indication of the pedal position throughout the full range of movement of the pedal.

p Alternatively, a switch may be used to indicate the "foot-on" condition and another sensor (e.g. rotary potentiometer) used to measure the pedal depression throughout the remaining range of movement and the pedal.

The "foot-off" condition is set at a second predetermined level of depression of the accelerator pedal from the fully released condition which is smaller than the first level of depression to take into account the hysteresis of the pedal linkage etc. Thus as the accelerator pedal is released wren the pedal passes through this second predetermined level of depression as it approaches the fully released position the electronic control unit switches the reference speed signal to the predetermined amount above idle speed.

The foot-off condition can again be detected by a separate switch or using the same sensor (eg. a rotary potentiometer) which provides the indication of the pedal position throughout the full range of movement of the pedal.

BRIEF DESCRIPTION OF THE INVENTION

One embodiment of the present invention will now be described, by way of example only, with reference to the accompanying drawings in which:

FIG. 4 shows the variation with time of the reference signal level of clutch engagement and accelerator pedal position during low speed manoeuvring.

DESCRIPTION OF THE PREFERRED EMBODIMENTS

Figure 1:
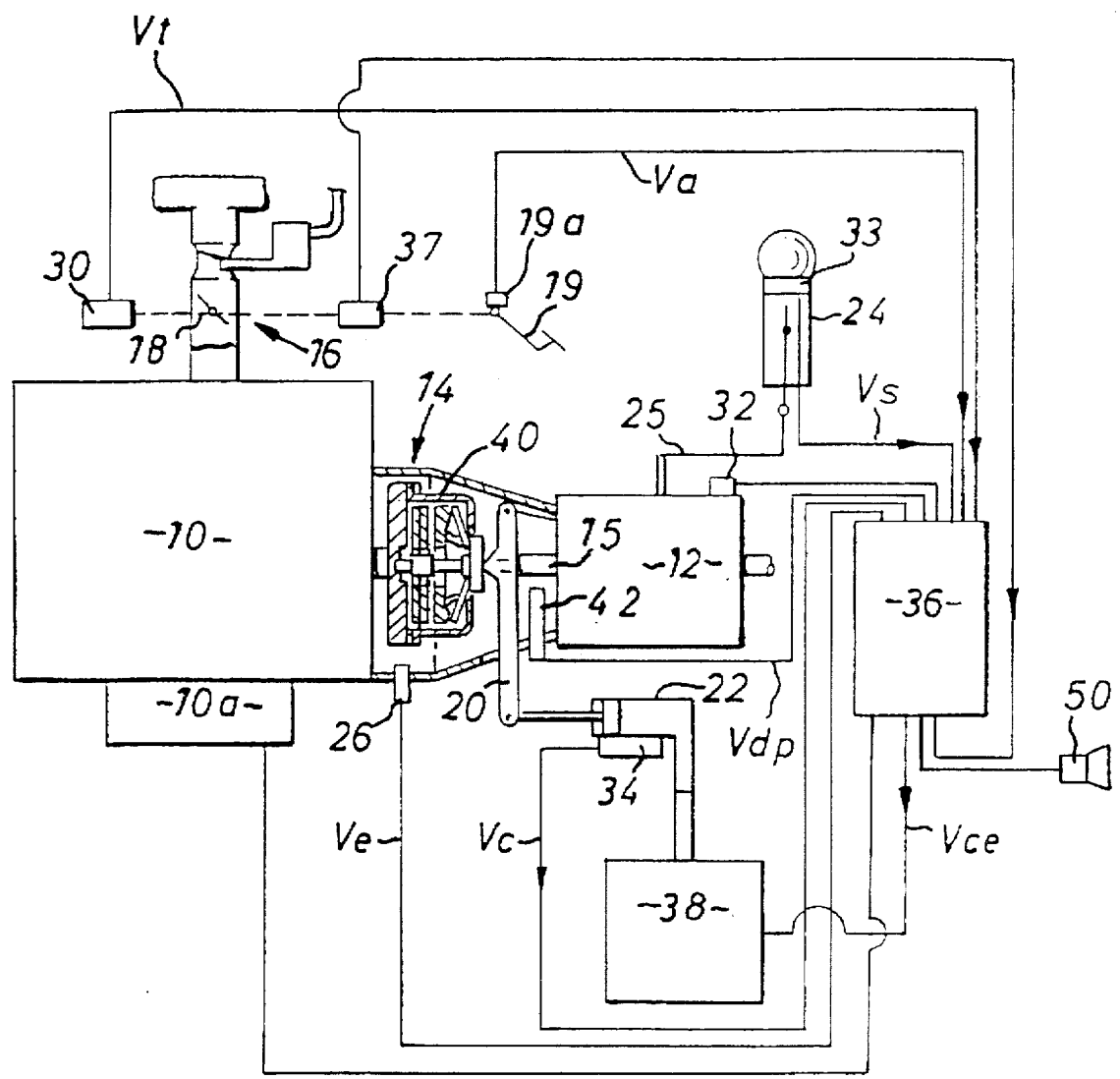
FIG. 1 shows in diagrammatic form the general layout of a clutch control system of the kind specified embodying the present invention.

Referring to FIG. 1 this shows an engine 10 with a starter and an associated starter circuit 10a which is coupled through a friction clutch 14 with a gearbox 12 via a gearbox input shaft 15. In the example described, fuel is supplied to the engine by a throttle 16 which includes a throttle valve 18 operated by an accelerator pedal 19. The invention is equally applicable to electronic or mechanical fuel injected petrol or diesel engines.

The clutch 14 is actuated by a release fork 20 which is operated by a slave cylinder 22. The gearbox is controlled by a gear ratio selector member in the form of a lever 24 which is connected with the gearbox via a selector linkage 25 and which includes a load-sensing switch means 33 which detects forces applied to the lever 24 by the driver and produces a signal Vs indicating an intention to change gear.

An electronic control unit 36 controls the actuation of the clutch 14 via an hydraulic control 38 which controls the operation of slave cylinder 22. Control unit 36 receives signals Vs from gear lever 24 and signals Ve proportional to engine speed from engine speed sensor 26. Signals Vt from throttle valve position sensor 30 proportional to the current throttle opening and accelerator pedal position signals Va from an accelerator position sensor 19a are also fed to control unit 36. Control unit 36 also receives a gear signal Vg from gear position sensor 32 which corresponds to the gear ratio currently engaged, signals Vc from slave cylinder position sensor 34, which varying with the position of the slave cylinder, and signals Vdp proportional to clutch driven plate speed from speed sensor 42 which actually senses the speed of the gearbox input shaft 15 (which is equal to that of a driven plate 40 of the clutch 14). Since the speed of the vehicle depends on the driven plate speed and the gear engaged, the driven plate speed sensor 42 acts in effect as a vehicle speed sensor and vice versa. Thus in some applications no drive plate speed sensor 42 is provided and this speed is calculated from the gearbox ratio and the vehicle speed which is given by a separate sensor.

A throttle control 37 is operated by the control unit 36 so that the throttle can be opened and closed independently of the accelerator pedal 19. A buzzer 50 is connected with control unit 36 to warn/indicate to the vehicle operator when certain vehicle operating conditions occur. In addition to or in place of buzzer 50 a flashing warning light (not shown) may be used.

Figure 2:
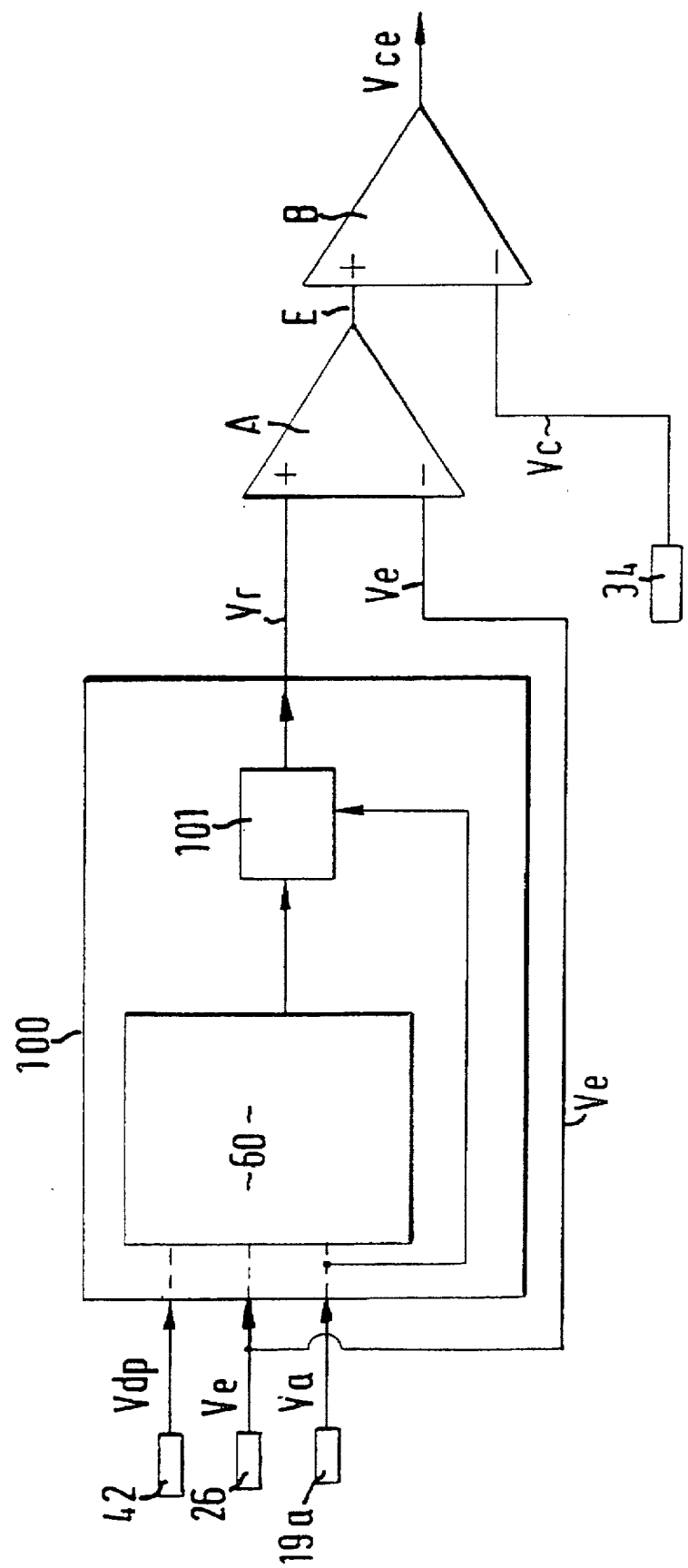
FIG. 2 shows in block diagram form the generation of the clutch take-up reference signal in the electronic control unit of the present invention.

Control unit 36 includes a reference signal generator 100 (see FIG. 2) which generates a reference signal Vr representative of a desired engine speed. This reference signal is compared in comparator A with the actual engine speed signal Ve from sensor 26 to produce an error signal E which is compared in comparator B with the clutch actuator position signal Vc from sensor 34 to provide a clutch engagement control signal Vce which control unit 36 outputs to hydraulic control 38. Operation of a control unit in this manner is described in more detail, for example, in the applicants earlier European Patents 0038113 and 0043660 to which the reader should refer if further details are required. The applicants co-pending UK Patent Application No. 94 022730.7 (applicants reference A2510) includes a detailed description of the main block 60 of reference signal generator 100 which detailed description is hereby incorporated in the present description.

In addition to controlling the engagement and disengagement of clutch 14 the control unit 36 also controls the throttle setting via control 37 when its control logic indicates that an override of the throttle opening set by the driver's operation of the accelerator 19 is desirable. In some applications the throttle control 37 may be omitted.

Figure 3:
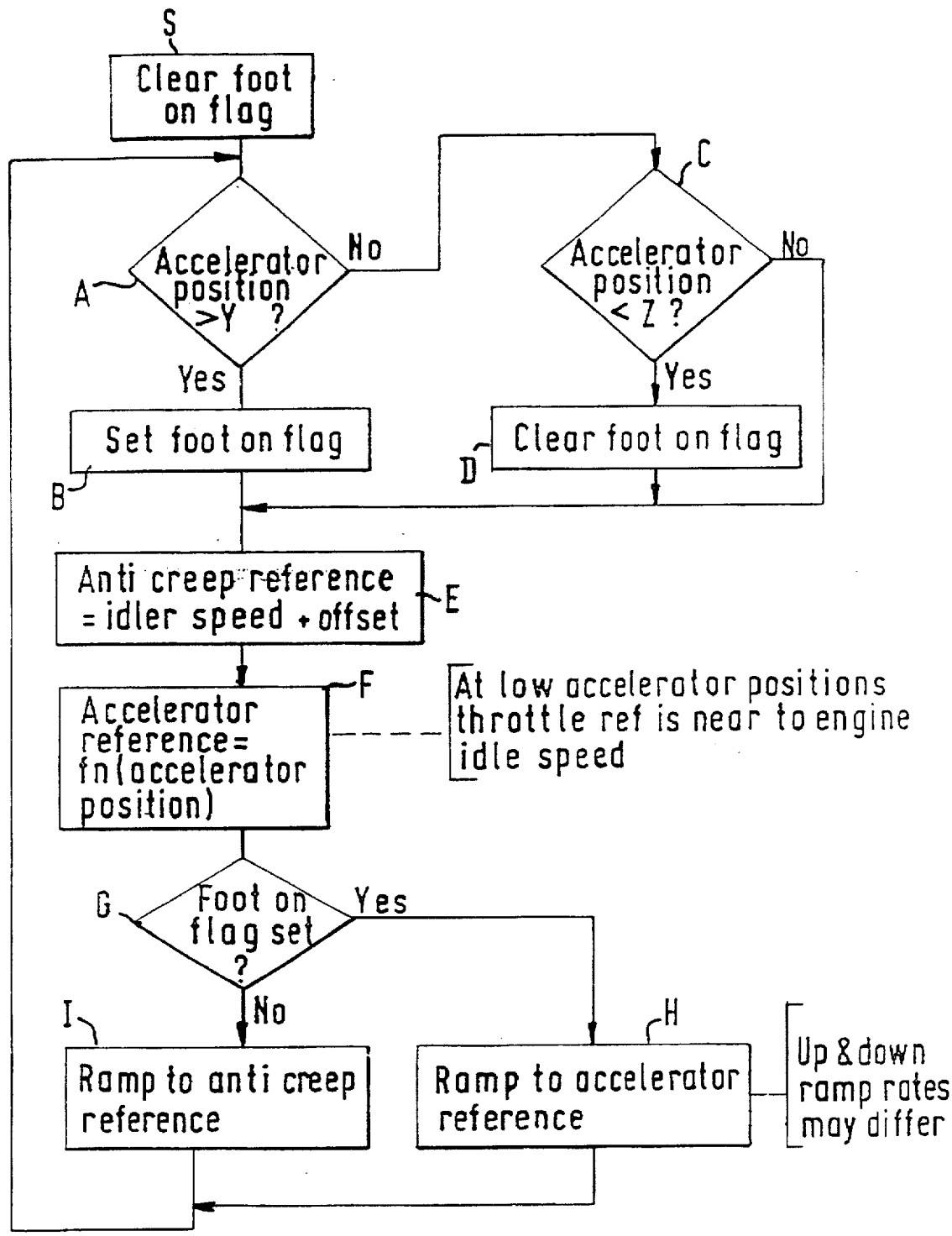
FIG. 3 shows the logic diagram for the generation of the low speed take-up reference signal.

In accordance with the present invention in addition to the main block 60, the reference signal generator 100 includes an additional low speed control block 101 which is operative in the initial range of travel of the accelerator pedal 19 to carry out the low speed reference signal generation routine of FIG. 3.

The operation of the clutch control system is as follows.

At time "t0" (see FIG. 4) the accelerator pedal is completely released and the reference speed is maintained at a level well above engine idle speed as shown at a 4a(i) in FIG. 4a. The clutch control system responds by holding the clutch at a non torque transmitting level so that the vehicle does not move. This is shown at 4b(i) in FIG. 4b.

If at time "t1" the accelerator is depressed and at time "t2" it reaches a level "X" (see FIG. 4c). Since this level is less than a "foot on" detection threshold "Y", the reference speed signal is unaffected and remains at the 4a(i) level well above engine speed. Thus the clutch remains at a non torque transmitting level and the vehicle does not move.

If the accelerator pedal is then depressed again and at time "t3" it crosses the "foot on" detection threshold "Y". The reference speed signal is then ramped down at a predetermined rate to a level determined by accelerator position as shown at 4a(ii). The relationship between accelerator position and reference speed is such that, at low levels of accelerator depression, the reference speed is close to engine idle speed as shown at 4a(iii). As the reference speed signal is ramped down to it's new level, the clutch control system responds by engaging the clutch to a torque transmitting level as at 4b(ii). This enables the vehicle to be manoeuvred safely and precisely at a low engine speed.

Between time "t4" and "t5" the accelerator position is varied further and the reference speed signal is modified accordingly as shown at 4a(iv). During this period, the clutch control system responds by modulating the level of clutch engagement in order to minimise the error between engine speed and the reference speed signal. This is shown at 4b(iii).

At time "t5" the accelerator pedal depression starts to reduce and at time "t6" it crosses the "foot off" detection threshold "Z". In response to this, the reference speed signal is ramped up at a predetermined rate, back to its initial level 4a(i) ie. well above engine idle speed. The clutch control system responds by disengaging the clutch to a non torque transmitting level thus preventing the vehicle from moving.

FIG. 3 shows the logic steps used to implement the above operation.

Initially, any existing accelerator pedal condition indicating flags are cleared at Box S.

Box A tests whether the accelerator depression is greater than the "foot on" threshold Y (using the output from sensor 19a or an additional switch) and if a "yes" condition is detected sets a "foot on" flag in the control unit at box B.

If a "no" condition is detected at box A then box C tests whether the accelerator depression is less than the "foot off" threshold Z. If a "yes" condition is detected at box C the "foot on" flag is cleared at box D. If a "no" condition is detected the logic routine moves to box E in which and anti-creep reference speed signal is calculated to be equal to the idle speed plus the predetermined offset (typically the offset is 400 rpm) as indicated at level 4a(i).

In box F an acclerator reference is calculated which is varied as a function of the accelerator pedal position.

Box G tests whether the "foot on" condition exists (using the output from sensor 19a or an additional switch). If a "yes" condition is detected the reference signal is ramped down (Box H) towards the accelerator reference level (derived from Box F) corresponding to the current throttle pedal position. If a "no" condition is detected the reference signal is ramped up (in box I) to the predetermined anti-creep 4a(i) level well above the idle setting.

As will be evident from the above by ensuring that the reference signal is well above the idle speed setting when the accelerator pedal is released (ie. the "foot off" condition is detected) any tendency for the vehicle to creep at idle is eliminated. Also, by ramping down the reference signal on the detection of the "foot on" condition of the accelerator pedal it is possible to provide a level of clutch engagement sufficient for low speed manoeuvring of the vehicle without the need to raise the speed of the engine significantly above idle speed.

As indicated above all depressions of accelerator pedal 19 can be measured solely using a single sensor 19a such as a rotary potentiometer. Alternatively, the "foot-on" and "foot-off" condition with their associated thresholds Y and Z can be measured using switches and an additional sensor, such as a rotary potentiometer, used to measure the accelerator depression throughout the rest of its movement range.

The control system of the present invention may also include an adaptive device which automatically takes into account variations between different vehicle installations in the initial level of movement of accelerator pedal 19 necessary to produce discernible increase in engine speed above idle due to the inevitable accelerator pedal linkage deadband.

Typically such an adaptive device would form part of control unit 36 and would be pre-programmed to expect an increase in engine speed above idle after a predetermined angle of movement of the accelerator pedal from the "foot-off" condition. The device would check at what actual accelerator angle the increase in engine speed occurs (using the signals from sensors 19a and 26) and then replace the pre-programmed angle with the actual angle. The control unit can then be pre-programmed to set the "foot-on" condition in a pre-determined relation to the actual angle of depression of the accelerator pedal at which the first increase in engine speed above idle is detected.

For example, if it is thought preferable for the driver to be able to detect a small increase in engine speed above idle before the vehicle begins to move when undertaking a low speed manoeuvre, the system can be set to change to the "foot-on" condition in which the reference signal is ramped down for low speed manoeuvring slightly after the actual accelerator pedal angle at which an increase in engine speed above idle occurs. Alternatively in Other installations the change to the "foot-on" condition can be set to coincide with the actual angle or even precede it if desired.

We claim:

1. A clutch control system for an automatic control of a clutch of a motor vehicle, which control system connects an engine with a multi-ratio gearbox under the control of a ratio selector means, the control system including an electronic control unit which controls initial clutch take-up on starting of the vehicle, clutch re-engagement following each ratio change, clutch disengagement on operation of the ratio selector means to change the operative ratio of the gearbox, and clutch disengagement upon coming to rest of the vehicle, the level of clutch engagement being controlled by the control unit in response to an engine speed error signal derived from a comparison of, a sensed current engine speed and a reference speed signal generated by the control unit and the control system also including sensing means to detect a "foot-off" condition of an engine controlling accelerator pedal and to provide an indication of a full range of movement of the accelerator pedal from the "foot-off" condition to a fully depressed position, the system being characterized in that the electronic control unit responds to a detected accelerator pedal "foot-off" condition by setting said reference speed signal higher than an engine idle signal by a predetermined amount to prevent creeping of the motor vehicle due to partial clutch engagement at engine idle and said control unit responds to a detected "foot-on" condition of the accelerator pedal at predetermined low levels of accelerator pedal depression by setting said reference speed signal to a level substantially equivalent to an engine idle speed which is a function of the accelerator pedal position, such that at said predetermined low levels of pedal depression, the clutch will engage to a torque transmitting level allowing the vehicle to be maneuvered at low engine speeds.

2. The clutch control system according to claim 1 in which the "foot-on" condition is set at a first predetermined level of depression of the accelerator pedal from the fully released position of the pedal.

3. The clutch control system according to claim 1 in which detection of the "foot-on" condition of the accelerator pedal is accomplished by a sensor which also provides the indication of the pedal position throughout the full range of movement of the pedal.

4. The clutch control system according to claim 1 in which a switch is used to indicate the "foot-on" condition and another sensor is used to measure the pedal depression throughout the remaining range of movement of the pedal.

5. The clutch control system according to claim 1 in which the "foot-off" condition is set at a second predetermined level of depression of the accelerator pedal from the fully released condition which is smaller than the first level of depression to take into account any hysteresis associated with operation of the accelerator pedal.

6. The clutch control system according to claim 1 in which the "foot-off" condition is detected by the same sensor which provides the indication of the pedal position throughout the full range of movement of the accelerator pedal.

7. The clutch control system according to claim 1 in which the "foot-off" condition is detected by a seperate switch.

8. The clutch control system according to claim 1 which includes an adaptive device which detects and stores the level of accelerator depression at which a discernible increase in engine speed above idle occurs and then sets the "foot-on" condition in a predetermined relationship to said level of accelerator depression.

9. The clutch control system according to claim 3 in which the "foot-off" condition is set at a second predetermined level of depression of the accelerator pedal from the fully released condition which is smaller than the first level of depression to take into account any hysteresis associated with operation of the accelerator pedal.

10. The clutch control system according to claim 3 in which the "foot-off" condition is detected by the same sensor which provides the indication of the pedal position throughout the full range of movement of the accelerator pedal.

11. The clutch control system according to claim 4 in which the "foot-off" condition is set at a second predetermined level of depression of the accelerator pedal from the fully released condition which is smaller than the first level of depression to take into account any hysteresis associated with operation of the accelerator pedal.

12. The clutch system according to claim 4 in which the "foot-off" condition is detected by the same sensor which provides the indication of the pedal position throughout the full range of movement of the accelerator pedal.

13. The clutch control system according to claim 8 in which the "foot-on" condition is set to occur after a delay, after said level of accelerator depression at which a discernible increase in engine speed above idle is detected.

* * * * *